United States Patent [19]

Maris

[11] 4,435,695
[45] Mar. 6, 1984

[54] METHOD OF PREDICTING THE APPROACHING STALL OF AN AIRCRAFT WING

[76] Inventor: John M. Maris, E.R.A.U. Box 2188, Daytona Beach, Regional Airport, Daytona Beach, Fla. 32014

[21] Appl. No.: 219,188

[22] Filed: Dec. 22, 1980

[30] Foreign Application Priority Data

Dec. 24, 1979 [GB] United Kingdom ............... 7944397

[51] Int. Cl.³ ............................................. G08G 5/00
[52] U.S. Cl. ................................. 340/966; 244/194;
73/147; 73/178 R; 324/65 R
[58] Field of Search ............... 340/27 SS, 27 R, 606;
364/426; 244/191, 182, 192, 194; 73/178 T, 178
R, 204, 179, 147; 324/65 R

[56] References Cited

U.S. PATENT DOCUMENTS

| | | | |
|---|---|---|---|
| 2,431,241 | 11/1947 | Godsey | 340/27 SS |
| 2,596,116 | 5/1952 | Bamber | 340/27 SS |
| 2,638,579 | 5/1953 | Dyche et al. | 340/27 SS |
| 4,229,725 | 10/1980 | Reilly | 340/27 SS |

Primary Examiner—Donnie Lee Crosland
Attorney, Agent, or Firm—Jordan and Hamburg

[57] ABSTRACT

A method of predicting the approaching stall of an aircraft wing which is dependent on an inherent characteristic of the airflow as the stall is approached. The method described uses a hot-wire probe which measures the turbulence of the airflow at a predetermined location on the top surface of the wing. When the turbulence exceeds a threshold, which threshold is dependent on the air-speed, a signal is produced which indicates that a stall is imminent. The method can be particularly applied to an artificial stall warning device fitted to a transport aircraft.

14 Claims, 17 Drawing Figures

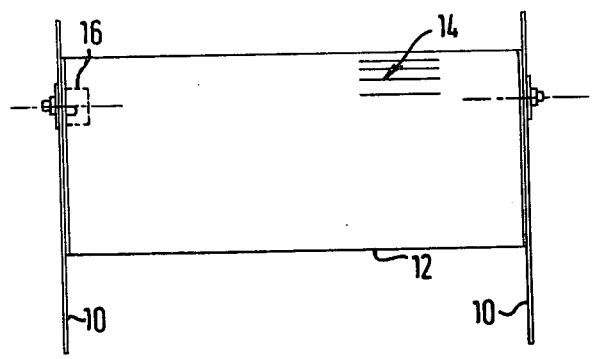
FIG.1.
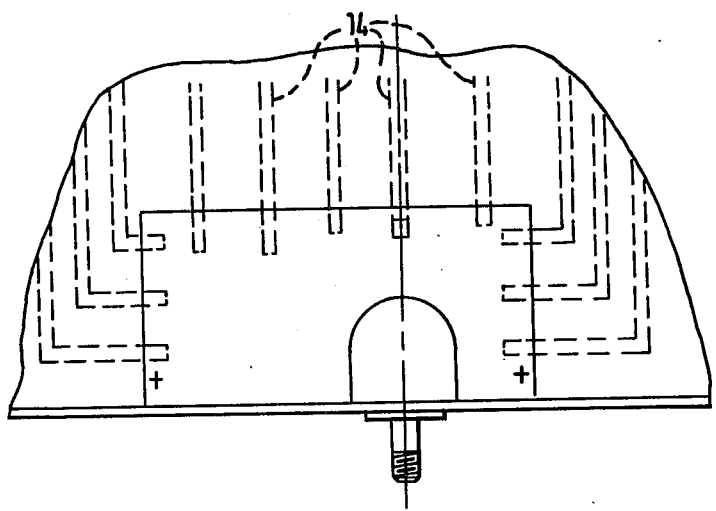
FIG.2.
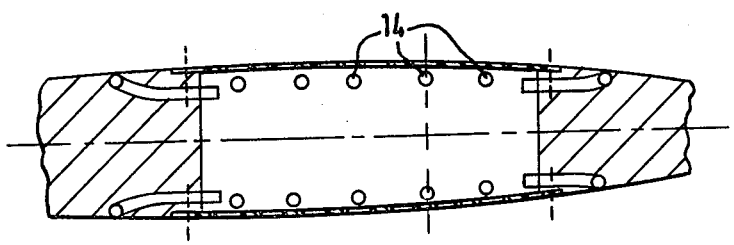

METHOD OF PREDICTING THE APPROACHING STALL OF AN AIRCRAFT WING

The present invention relates to a method of predicting the approaching stall of an aircraft wing.

An artificial stall warning device is almost universally fitted to transport aircraft. The role of the equipment is to augment, or substitute for, the natural stall symptoms, which may vary according to the aircraft configuration, weight, attitude, and the manoeuvre being performed. Surprisingly, even complex aircraft often have to rely on basic stall detection devices. These fall generally into two groups:

1. Those actuated by a hinged vane mounted on the leading edge of the wing, sensitive to the position of the stagnation-point of the airflow.
2. The more sophisticated angle-of-attack systems.

The wing leading edge device senses the movement of the stagnation point as it transitions from above the vane to below it, as the stall is approached. Inherent in such a system are several disadvantages:

1. The vane is very prone to interference from gusts, and, in addition, is badly affected by transient g-loadings that arise in turbulence.

The resulting nuisance warnings are most pronounced at low speeds (where a given gust velocity is a greater percentage of the aircraft speed, and the inertia of the machine is low, which compounds the g-loading problem). Because of this, the system is most likely to be ignored just when it is most needed during take-off and landing. At best, the spurious warnings are distracting at a critical time.

2. A problem arises because of the limited number of vanes that are fitted to the aerofoil. Having just one or two sensors is undersirable because only a small part of the airflow is sampled. In fact, a second vane is often required because a single unit cannot cope with changes of aircraft configuration (The lowering of flap, for example). This serves to highlight the inherent inflexibility of such a system.
3. The final serious problem relates to flight through icing conditions, which may alter the performance of the device in several ways, even if the vane itself is heated. When an aerofoil ices up, its profile is altered. The result may be that the stalling angle-of-attack is reduced. The vane is then referenced to the wrong stalling angle, so that no warning may be provided even though the wing may have stalled. A similar situation arises for different reasons due to the locally disturbed flow at the wing leading edge. Flow distortion influences the position of the stagnation point so that the system again becomes inaccurate.

These last two problems arise because the sensor is calibrated for only one given situation. The system response does not adapt to altering circumstances, and indeed it cannot. It is not what might be called an 'intrinsic' stall warning device. The position of the stagnation point may or may not give valid information about the stall.

Even the angle-of-attack sensor is open to similar criticism. Although local flow disruption influences the system less, it is nevertheless unable to sense a change of situation and respond accordingly.

The present invention seeks to provide a system which is dependent on an inherent characteristic of the airflow as a stall is approached.

According to the present invention, there is provided a method of predicting the approaching stall of an aircraft wing, comprising; measuring the turbulence at a predetermined location relative to the wing section; and producing a signal indicative of imminent stalling when the turbulence exceeds an air-speed dependent threshold.

With a view to establishing the feasibility of this method, experiments have been carried out, as described below, with reference to the accompanying drawings in which:

FIG. 1 is a plan view showing details of an aerofoil used in the experiment;

FIG. 2 is a diagram showing pressure tube connections in the aerofoil;

The experiments were conducted under two-dimensional conditions in a low speed 3×3 wind tunnel, using a symmetrical NACA 0010 wing section. This was chosen because of its sharply defined stalling characteristics. Details of the mounting arrangements and model configuration can be seen in FIGS. 1, 3 and 4.

As may be seen from FIG. 1, rectangular end plates 10 are fitted to the wing section 12 to render the flow two dimensional. The wing section 12 is also provided with pressure tubes 14, described below and a pressure tube exit 16 on the underside of the wing section is also shown in FIG. 1.

Figure 3:
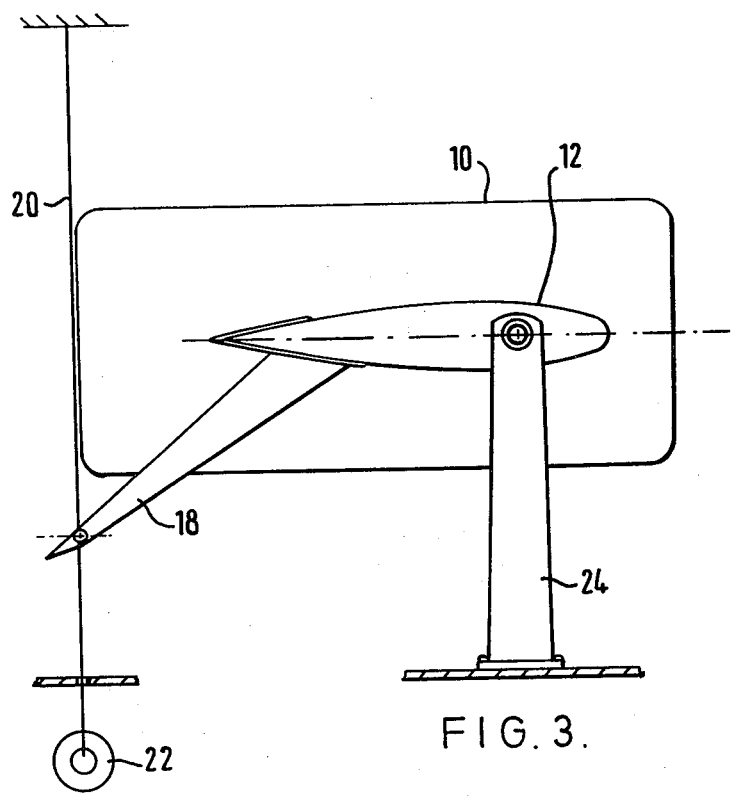
FIG. 3 is a side elevational view showing the mounting arrangement for the aerofoil.

As shown in FIG. 3, the wing section 12 is provided with a tail sting 18 which is supported from the roof of the tunnel by a cable 20, tensioned by tension weights 22. The wing section or aerofoil 12 is supported towards the front by struts 24, one on either side of the wing section.

The model was fitted with seventeen static-pressure taps on both the top and bottom surfaces, with provision for several such sets across the span. In order to minimise interference effects, a site was selected at approximately 80% span, as far away as possible from both the tail sting and the adjacent end plate. All the remaining taps were sealed off with adhesive tape.

The chordwise-pressure tap locations are shown in table 1 below c is the chord length, x is the distance from the leading edge of the wing.

TABLE 1

| Chordwise pressure-tap locations. x/c | |
|---|---|
| Upper surface | Lower surface |
| 0.0 | 0.0 |
| 0.0125 | 0.0125 |
| 0.0300 | 0.0300 |
| 0.0500 | 0.0500 |
| 0.0750 | 0.0750 |
| 0.1000 | 0.1000 |
| 0.1500 | 0.1500 |
| 0.2000 | 0.2000 |
| 0.2500 | 0.2500 |
| 0.3000 | 0.3000 |
| 0.4000 | 0.4000 |
| 0.5000 | 0.5000 |
| 0.6000 | 0.6000 |
| 0.7000 | 0.7000 |
| 0.8000 | 0.8000 |
| 0.8500 | 0.9000 |
| 0.9300 | 0.9400 |

The taps were connected to a multi-tube manometer, which included two tubes for the measurement of static and total pressures in the tunnel. These were connected in parallel to a Betz manometer to facilitate the setting up of a desired wind speed.

The velocity of the airflow was sensed by heated body probe means in the form of a hot-wire probe mounted on an aluminium channel from the roof of the tunnel.

The mechanism incorporated an electrically actuated vertical traverse, to alter the probe height above the model. A digital voltmeter connected to potentiometers in the motor drive was initially used for position information, but this arrangement gave trouble and so was replaced by a simple pointer and scale mounted on the probe-carrier and traverse-support respectively. Probe output was electrically processed to yield the required information, as detailed later.

Figure 4:
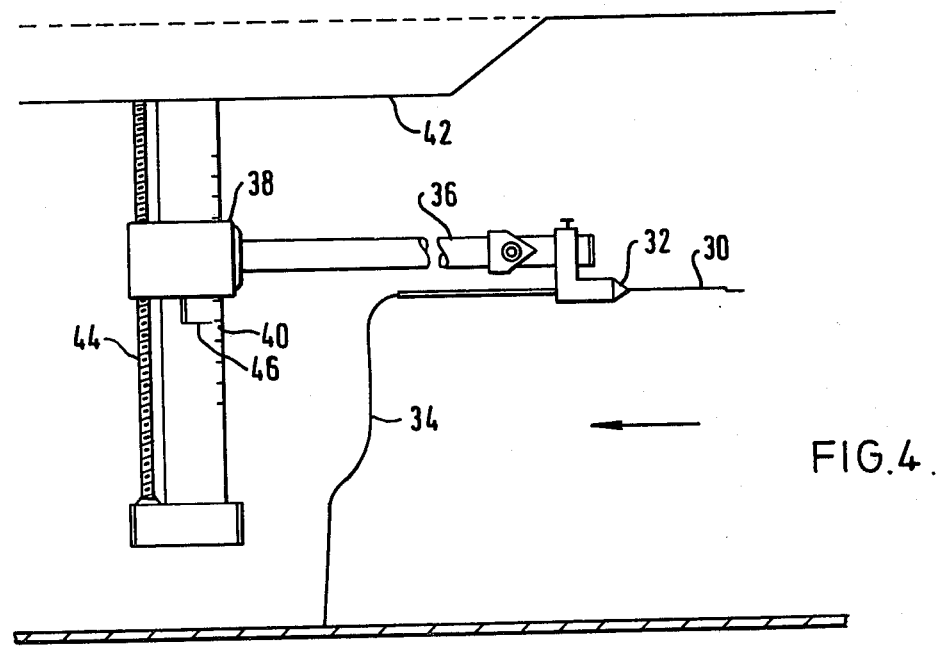
FIG. 4 is a side elevational view showing the probe mounting and traverse installation.
Figure 5:
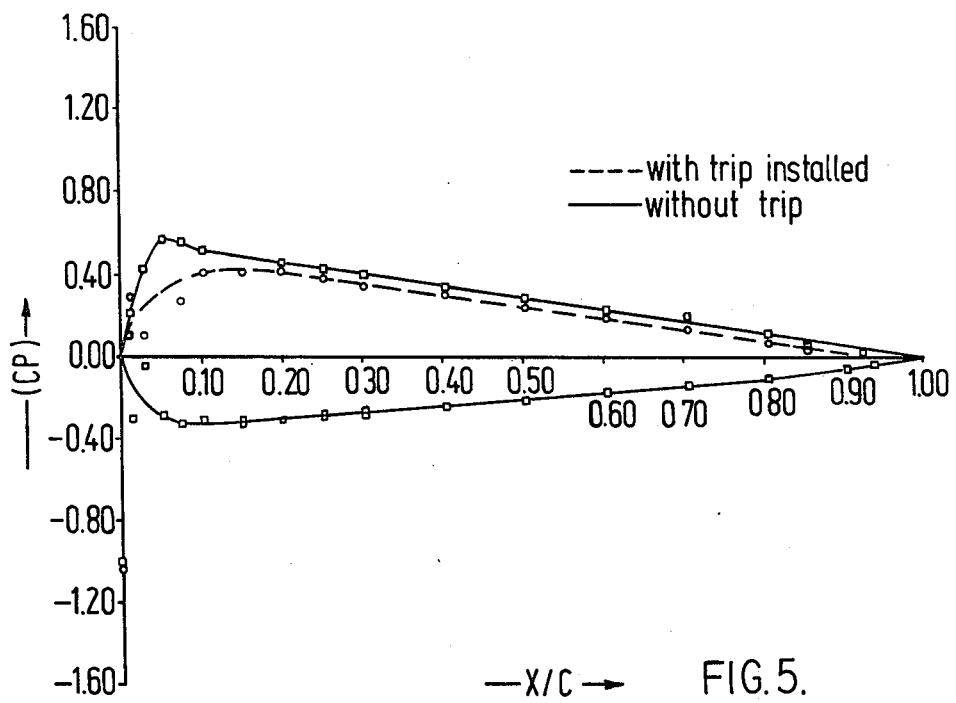
FIG. 5 is a graph of the aerofoil pressure distribution at an angle-of-attack of 0°.
Figure 6:
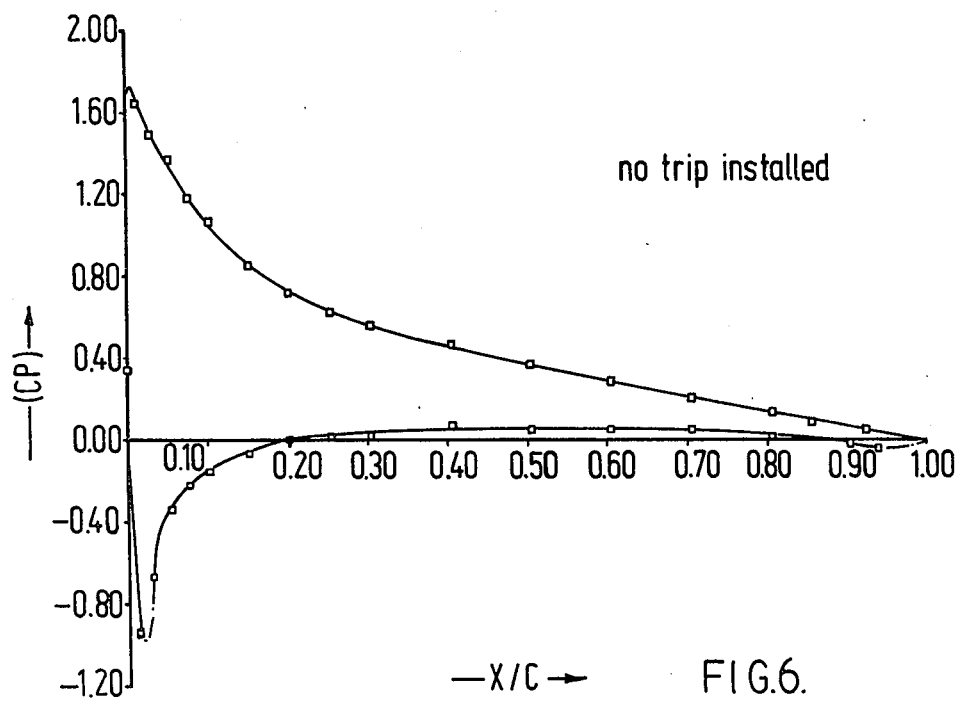
FIG. 6 is a graph of the aerofoil pressure distribution at an angle-of-attack of 5°.
Figure 7:
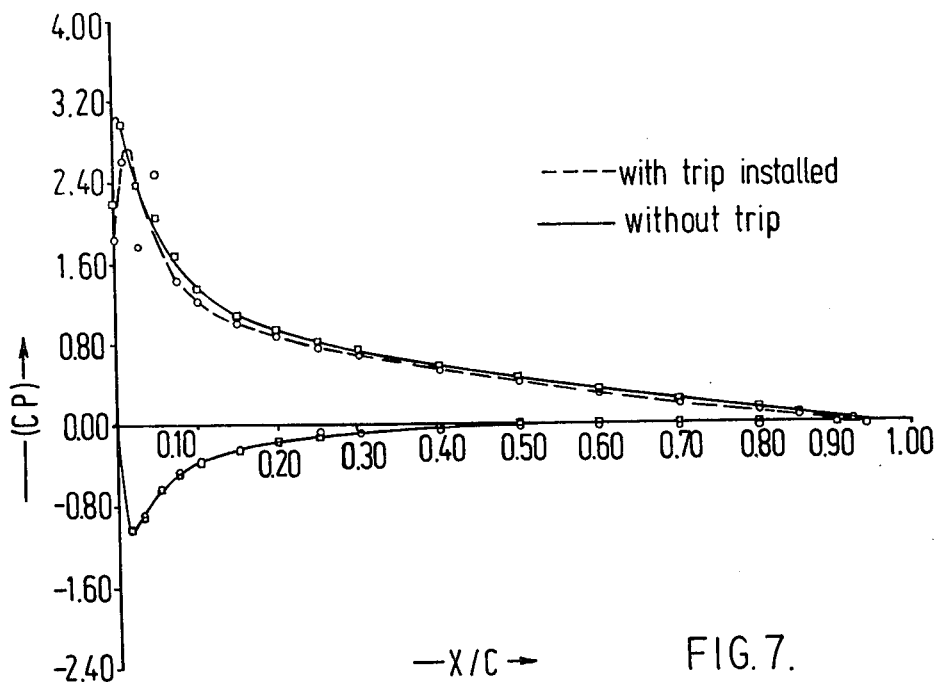
FIG. 7 is a graph of the aerofoil pressure distribution at an angle-of-attack of 8°.
Figure 8:
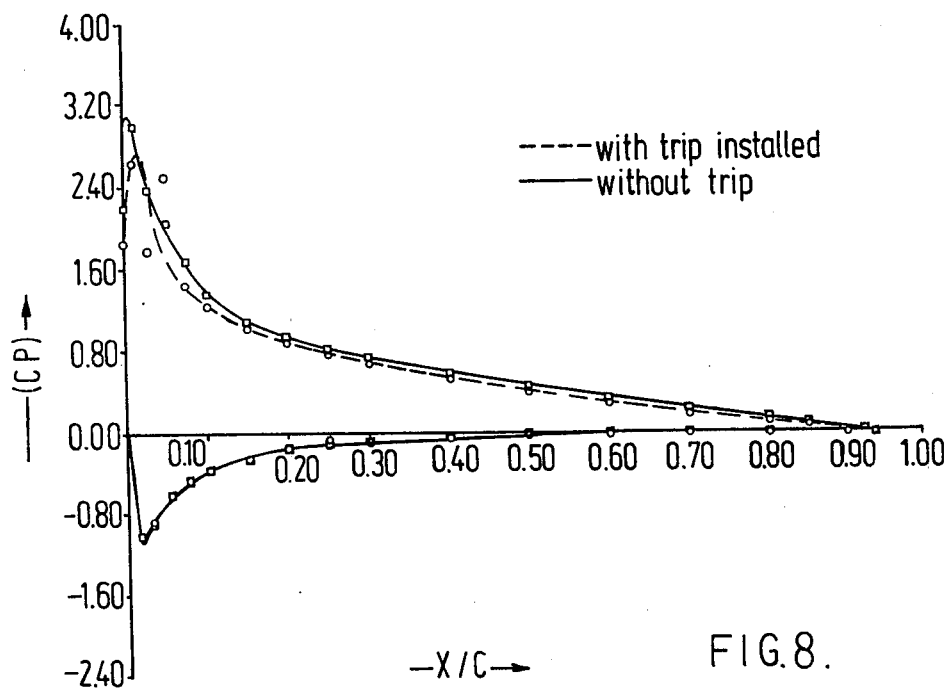
FIG. 8 is a graph of the aerofoil pressure distribution at an angle-of-attack of 10°.
Figure 9:
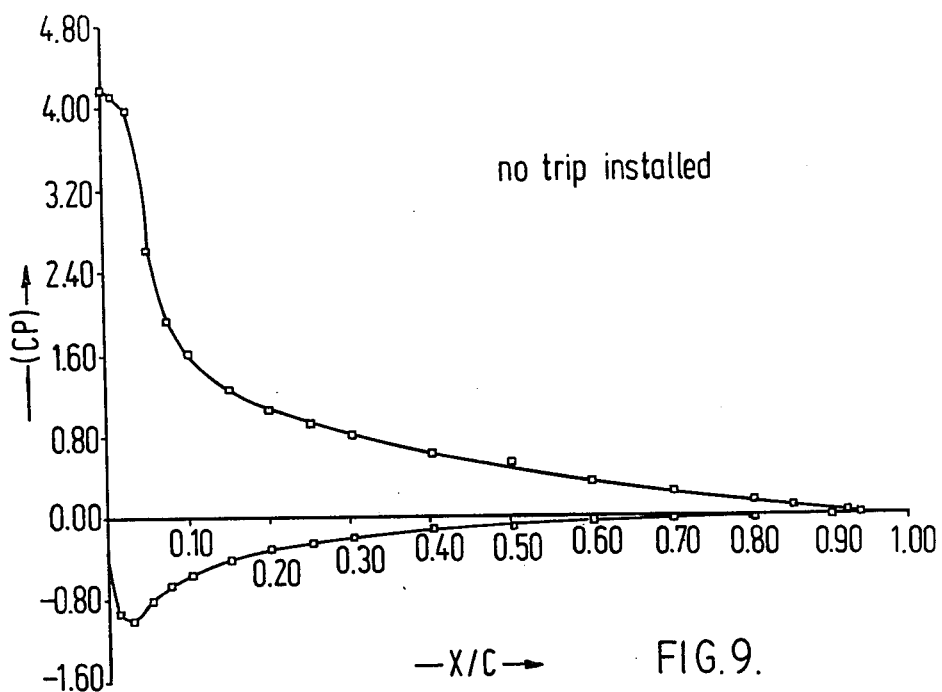
FIG. 9 is a graph of the aerofoil pressure distribution at 11°.
Figure 10:
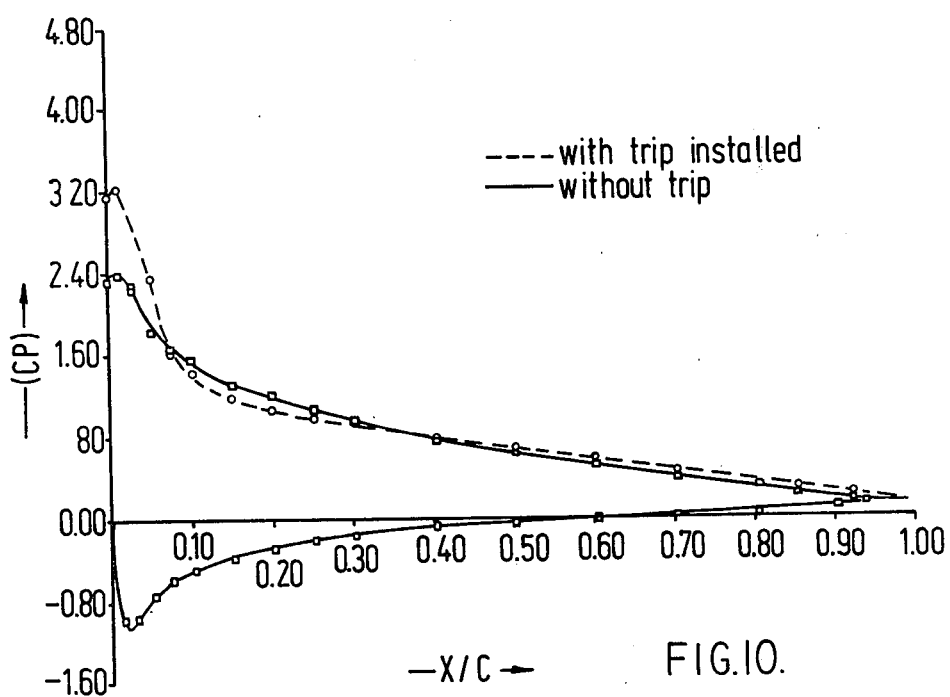
FIG. 10 is a graph of the aerofoil pressure distribution at an angle-of-attack of 12°.

The probe mounting and traverse installation is shown in FIG. 4. The hot-wire probe 30 extends from a probe holder 32 which is connected to a multi-pin connector via an output wire 34. The probe holder 32 is at one end of an extensible arm 36, the other end of which is connected to a probe carrier 38. The probe carrier 38 is mounted on a scale 40 which is attached to the aluminium channel 42 in the roof of the tunnel. The probe carrier 38 is moved up and down the scale 40 by means of a screwjack 44, and the height of the hot-wire probe 30 is indicated by a pointer 46 on the scale 40.

There was no force-balance fitted in the tunnel, and the model was fixed except for a provision to manually alter the incidence. The incidence was measured by a simple template and inclinometer.

The integrity of the pressure lines was tested, after which a series of runs was carried out to investigate the pressure distribution of the aerofoil and its stalling behaviour, with particular emphasis on the approach to the stall. Static pressure readings were recorded for nominal angles of attack of 0°, 5°, 8°, 10°, 11° and 12°, all at a test wind velocity of 17 m/s. The corresponding Reynolds number was $3.5 \times 10^5$ based on chord.

An elementary tuft survey was carried out using a single tuft mounted on a rod inserted into the tunnel. A tuft survey is a simple analysis of air flow patterns over the wing section which broadly indicates the aerodynamic behaviour of the wing, especially close to a stall. It consists of the attachment of cotton tufts to the aerofoil surface and observation of these tufts under varying conditions.

The time average velocity field was measured with the hot wire probe connected to an electrical balancing bridge and the output was passed through a low-pass filter with a 5 second time constant before being displayed on a digital voltmeter. This data does not appear separately, but is used in the calculations of turbulence intensity to follow.

Turbulence intensity is defined here as the ratio of the root mean square velocity fluctuations (URMS) to the time average velocity (u). With the apparatus used, it was impossible to obtain a direct readout of this quantity; however a simple relationship between turbulence intensity and the ratio of RMS and time average voltages exists. An RMS readout was achieved by connecting the probe output to an RMS voltmeter (in parallel to the previously mentioned low-pass filter, etc.) and, purely for the convenience of its digital output as compared to the analogue output of the RMS device, a further digital volt meter was installed in series.

With this equipment connected, a series of runs was carried out at nominal incidences of 8°, 9°, 10° and 11°, these representing the pre-stall region of most interest. For each incidence the probe was traversed vertically from just above the aerofoil surface until there was no further decrease in turbulence intensity, (i.e. until URMS became steady at the residual value corresponding to the inherent tunnel turbulence and probe interference effects, about 0.3% for these runs).

This series of traverses was carried out at two chordwise probe locations, corresponding to 33% and 66% chord.

Lastly, a trip-wire was taped to the upper surface of the aerofoil near the leading edge, to ensure flow transition. All the runs were then repeated, including the pressure-distribution measurements. Due to interference effects, it was impractical to carry out tests with the probe in the 33% chord position with the trip-wire installed.

This series of runs completed the experimental work.

Figure 11:
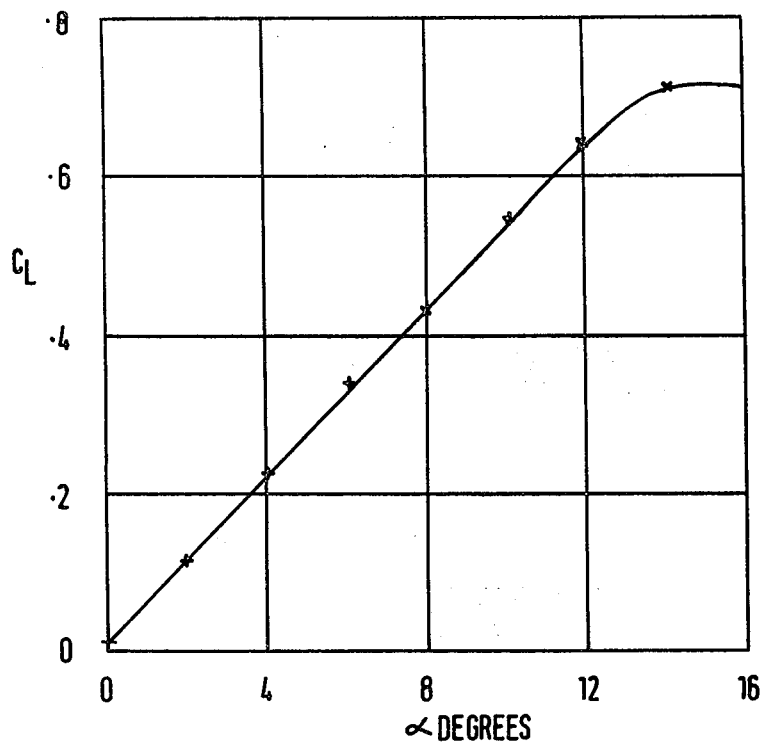
FIG. 11 is a graph of $C_L$ the coefficient of lift, mid-tunnel.
Figure 12:
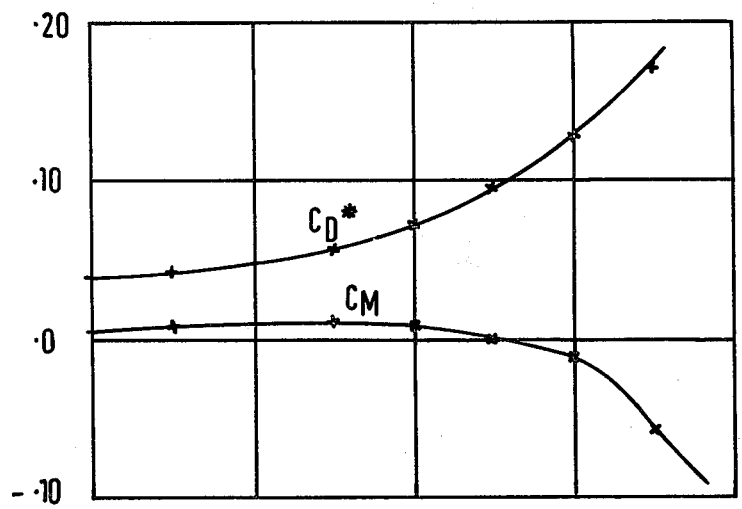
FIG. 12 is a graph of $C_D$ the coefficient of drag and $C_N$ the coefficient of pitching moment, mid-tunnel.
Figure 13:
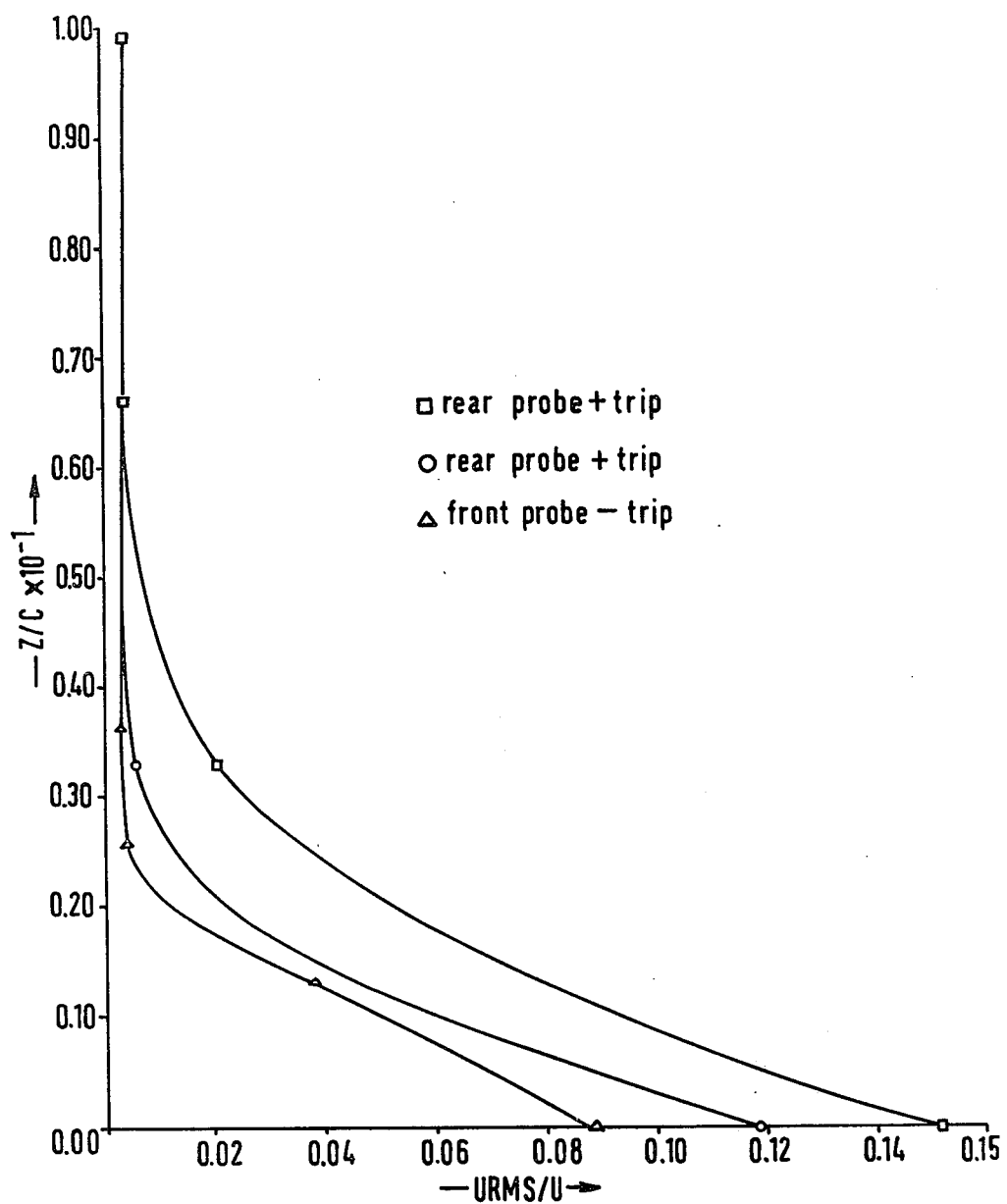
FIG. 13 is a graph of turbulence intensity of flow across a boundary layer at an angle-of-attack of 8°.
Figure 14:
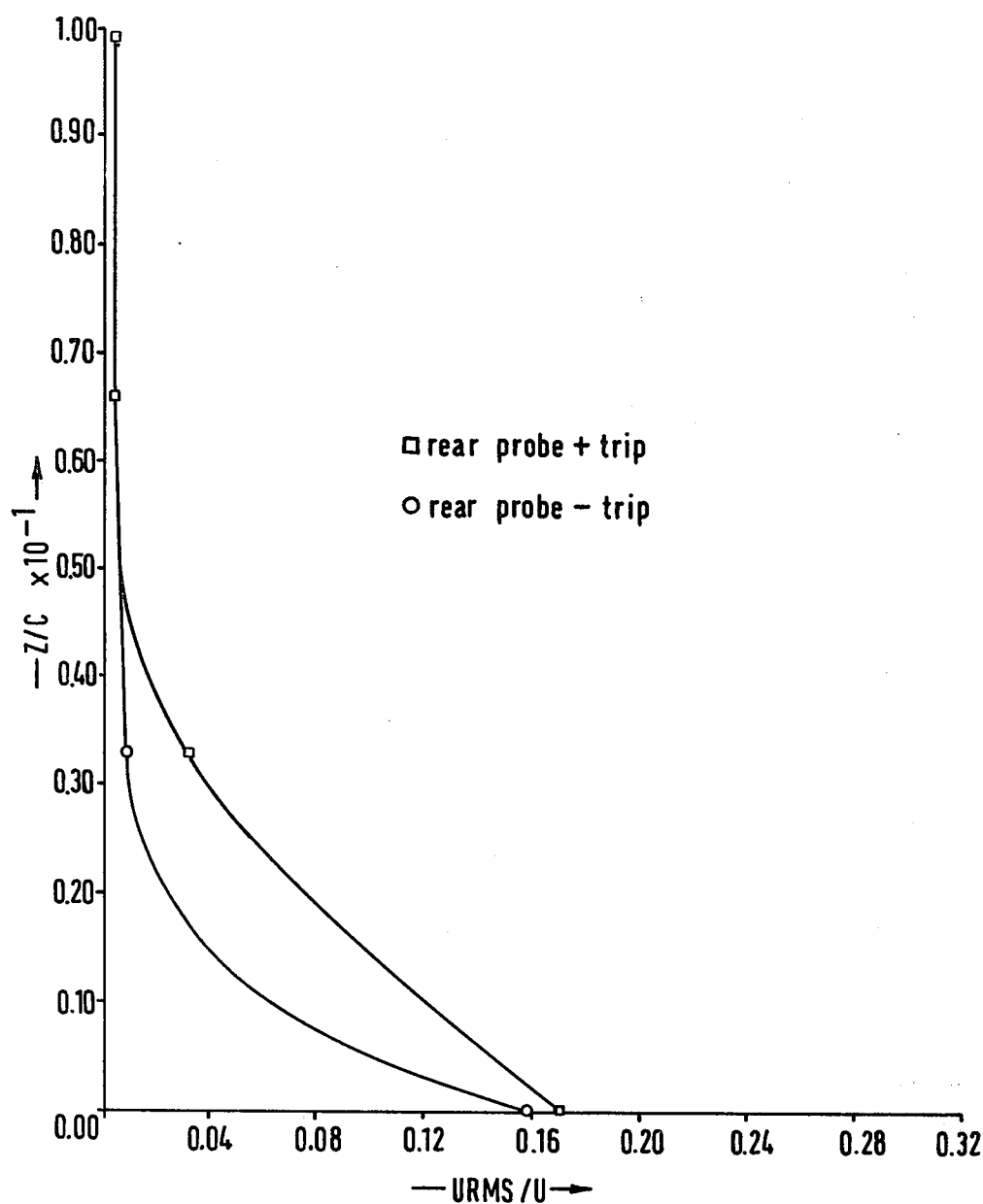
FIG. 14 is a graph of turbulence intensity of flow across a boundary layer at an angle-of-attack of 9°.
Figure 15:
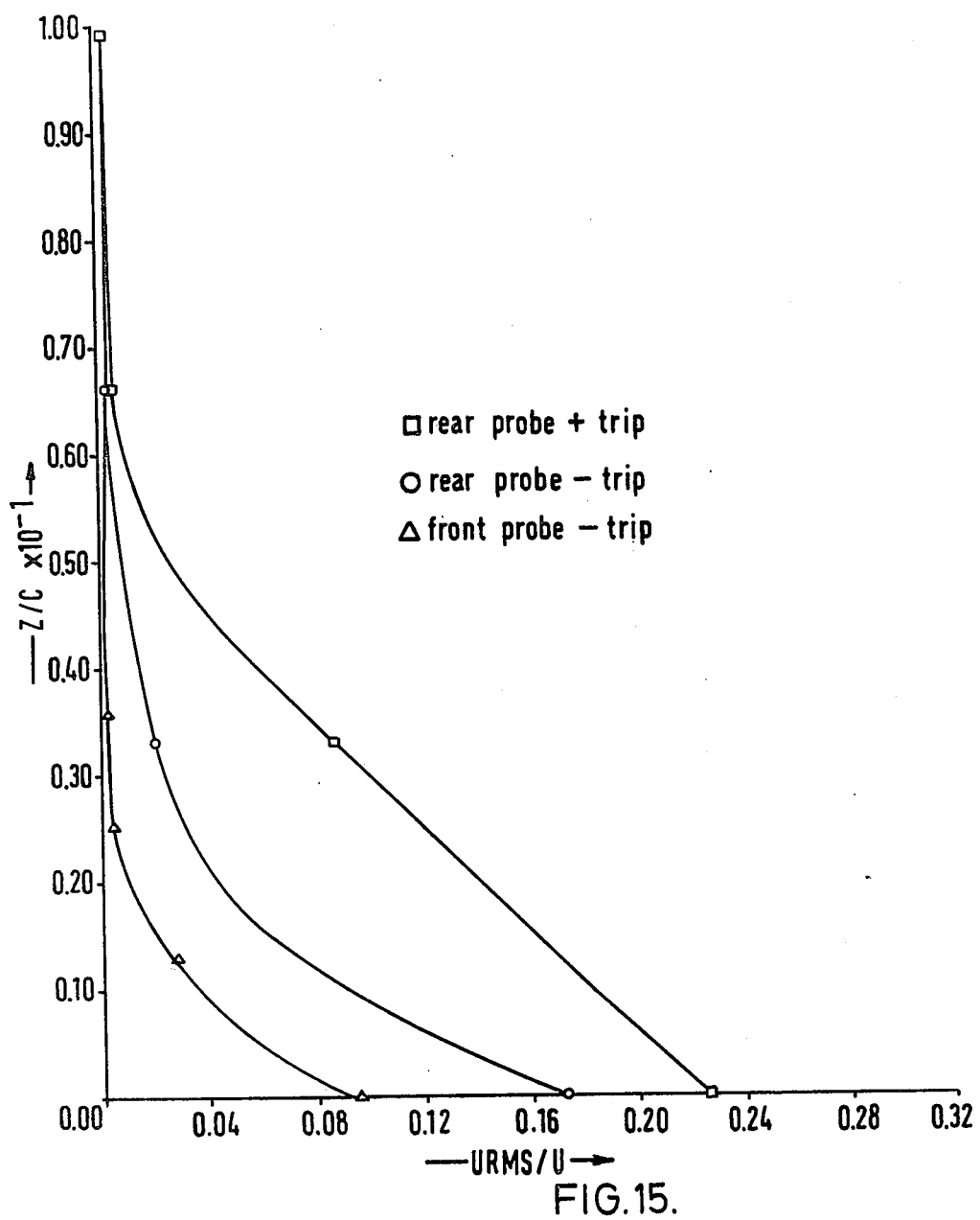
FIG. 15 is a graph of turbulence intensity of flow across a boundary layer at an angle-of-attack of 10°.
Figure 16:
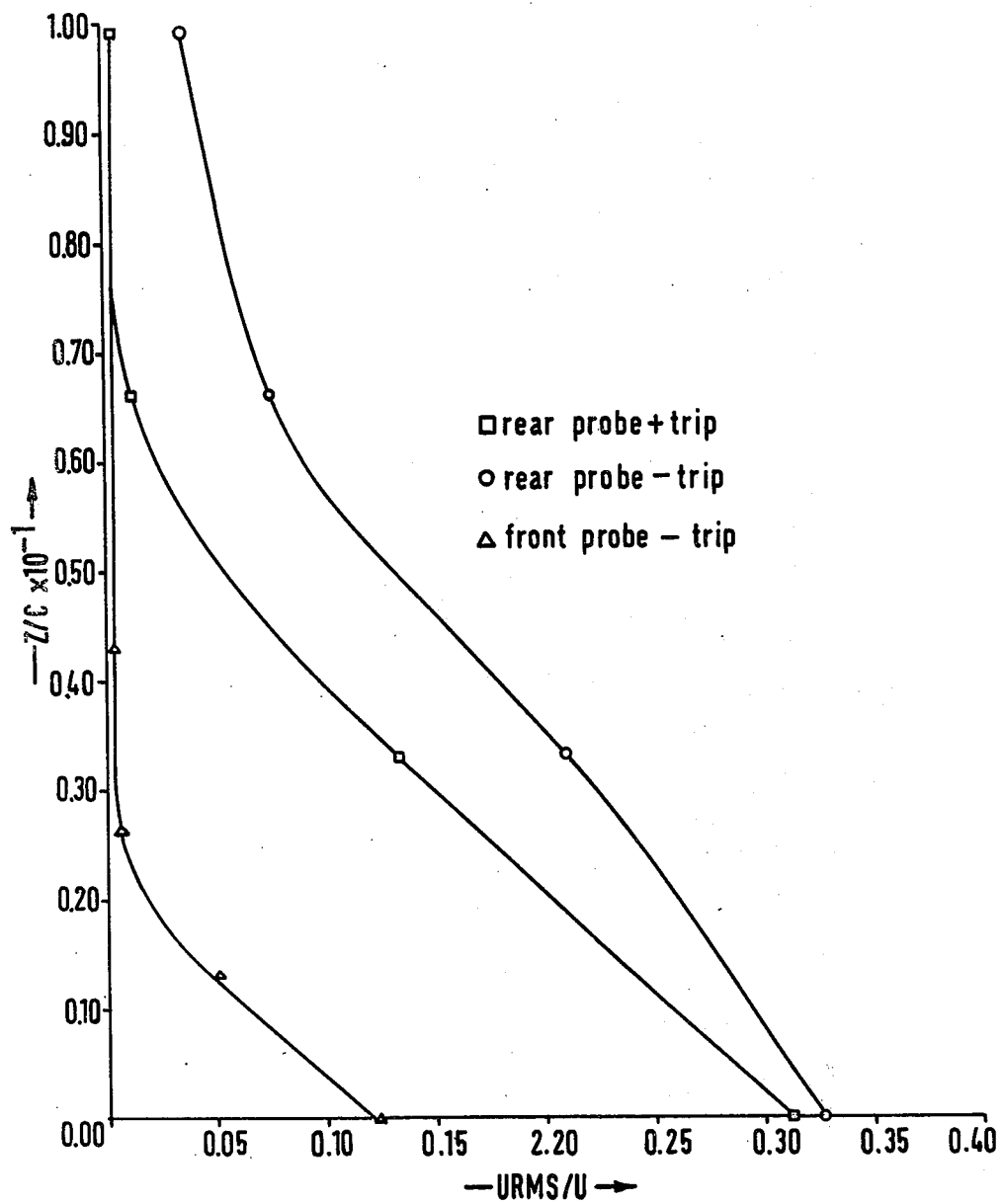
FIG. 16 is a graph of turbulence intensity of flow across a boundary layer at an angle-of-attack of 11°.

The readings were taken visually and then non-dimensionalised and static pressure profiles for the aerofoil were then plotted directly in the form (CP-x/c) for each incidence; CP is the suction (negative pressure), and x and c are as explained above. The results of these plots are shown in FIGS. 5 to 10 for various angles-of-attack ranging between 0° and 12°; the suction below the wing is shown below the x/c axis, the suction above the wing is shown above the x/c axis. The graphs of the pressure distribution, along with the tuft study, clearly show the behaviour of the aerofoil with increasing incidence. FIGS. 11 and 12 show the behaviour of the coefficients of lift, drag and pitching moment, $\alpha$ being the angle of attack;

Initially the pressure distribution is flat, with the exception of stations just behind the trip-wire which show a marked increase in suction over the plain case. As the angle-of attack increases a pronounced suction peak develops, which is highly localized, being in evidence only in the front 20% of the chord. The lower surface contribution is slight, with a small pressure rise at the leading edge trailing off to a pressure coefficient of almost zero further aft, at all incidences.

Approaching the stall (which occurs at about 12°), the suction peak collapses rapidly; in the case without the trip-wire, the suction decreases to about half its previous magnitude as the incidence rises from 11° to 12°. The tuft study shows the development of a flow "bubble" at the leading edge top-surface where the flow detaches before 5% chord and re-attaches at about 10%. This is uncharacteristic of full size aerofoils in common use, which tend to stall from the rear part first.

At the stall, marked pressure fluctuations occur over the front of the wing to the order of 15%.

Finally, at incidences above the stalling angle, the pressure field collapses to become uniform over both the top and bottom aerofoil surfaces.

The accuracy of these results varies depending upon when the pressure readings were measured. Before the stall, the pressure readings were measured and reproducable to 5%. This is shown in the good correlation between the pressure readings for the lower aerofoil surface, with and without the trip-wire. For a given nominal incidence instance these readings should be identical, and the graph show this to be nearly the case.

Obviously, the upper surfaces differ because of the effect of the trip-wire.

A further analysis and reduction was required to process the hot-wire output. The measured voltages were converted into values of turbulence intensity using an algorithm although it is possible to perform this by the use of a stored look-up table. The normalised results have been plotted, with the graphs of the front probe, rear probe and rear probe with trip-wire all superimposed, on FIGS. 13 to 16. They are plotted in the form URMS/u (root mean square velocity fluctuations/time average velocity) against z/c (height above wing expressed as a percentage of chord length), for the various angles-of-attack.

Since the turbulent air layer was a thin layer, only four observations were taken at each angle-of-attack. A suitable curvefit was plotted using a cubic spline approximation.

Figure 17:
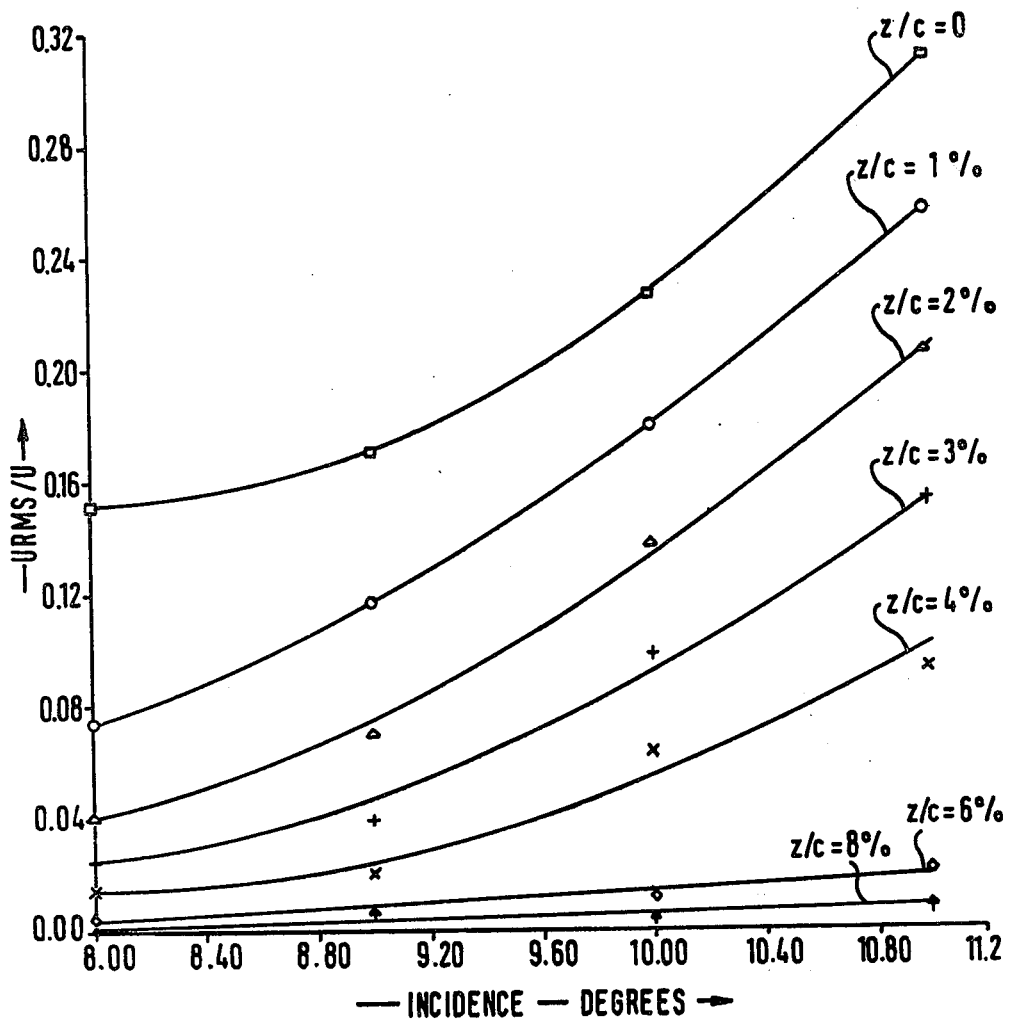
FIG. 17 is a graph of the probe turbulence response at various angles-of-attack.

The graph shown in FIG. 17 is a graph combining the results obtained from the measurements of turbulence intensity, and represents the relation between turbulence intensity and angle-of-attack for a family of probe heights above the aerofoil. It will be noted that the turbulence can be continuously sensed.

At low incidences, the turbulence intensity predictably decreased with increasing probe height above the aerofoil. The rear probe position with the trip-wire installed yields the greatest turbulence, followed by the rear probe without the trip, and finally by the front probe.

These observations are consistent with a thickening boundary layer towards the rear of the aerofoil, coupled with the transition from laminar to turbulent flow. This aspect shows up clearly when comparing the turbulence intensity with and without the trip-wire for the rear probe position. The trip-wire case is certain to have a turbulent boundary layer throughout while the plain case does not suffer transition until behind the probe location. The result is that the probe senses a greater turbulence intensity when the trip is fitted, especially at low incidences.

At higher incidence, the turbulent region, that is to say, the region where the level of turbulence exceeds that of the probe/interference/tunnel effects, thickens slightly, while the intensity at any given station increases. At 11° incidence, the plain aerofoil shows a very marked increase in turbulent activity, which exceeds that of the trip-wire case by up to 100%; this must be due to the plain wing no trip wire stalling, at least partially. The resulting eddies from the front of the wing greatly increase the turbulence intensity further downstream. This leading-edge stall is certainly to blame, as evinced by the tuft study, which shows few signs of airflow separation progressing foward from the trailing edge. The trip-wire ensures an early transition to the turbulent flow resulting in the mixing of higher energy air into the boundary layer. This more activated boundary layer stays attached until a higher incidence, resulting in fewer eddies and a lower turbulence level. This kind of behaviour, with an earlier transition to turbulent flow is more representative of a full size aircraft.

The ideal requirements for the suggested approach to stall warnings are as follows:

1. The initial level of turbulence intensity should be low at small angles-of-attack.
2. The turbulence intensity should increase rapidly as the stall is approached.

Consequently 3. the ratio of the intensities just before, and well before the stall, should be high.

All these conditions are fully met for probe locations between 1 and 4% z/c.

This is best demonstrated by means of an example based on FIG. 17. Working on the assumption that a stall warning should be activated at an incidence of 10°, and choosing a probe mounted at 2% z/c, then the following is observed:

The turbulence intensity TREBLES between the incidences of 8 and 10 degrees. The sensitivity to changes of angle-of-attack near the stall is thus very high. On the other hand, it can be seen by extrapolation of the curves to low incidences, that the sensitivity in these regions is very low. This is obviously desirable because spurious warnings at safe angles-of-attack should be eliminated.

The desirable results obtained above are examples of the best case. Performance should be almost as good for any of the probe heights between 1 and 4% z/c.

Outside the range, the operation is degraded, but is nevertheless in the correct sense—Increasing angles-of-attack produce higher levels of turbulence intensity. Obviously, the probe should not lie too far from the wing otherwise the turbulence starts off, and remains, at a very low level. Similarly, mounting the probe well into the boundary layer produces too much "noise", again harming performance.

The above experiments demonstrate that the method proposed is feasible. The fact that many of the results arrived at were in a non-dimensional form indicates that the results obtained on a small scale, as in the above described experiments, should be applicable to full scale aircraft wings. Naturally, this would require suitable calibration, and not all the instruments used in the experiments would be suitable for a full scale stall warning device based on the method of the present invention. For example, the hot wire used in the experiments is much too fragile in its present form to be used in full scale applications, but a more robust version of the hot wire would be suitable for installation on a full scale aircraft wing.

I claim:

1. A method of predicting the approaching stall of an aircraft wing, comprising:

sensing air speed over the wing at a predetermined location spaced above the top surface of the wing to thereby produce input signals representative of air speed fluctuations at said location, said fluctuations being caused by air turbulence over the wing;

using said input signals to produce a signal representative of a ratio of the air speed fluctuations to an average air speed; and using said ratio signal to produce a signal indicative of imminent stalling.

2. A method as claimed in claim 1, wherein said location is spaced from the leading edge of the wing by about 66% of the length of a chord of the wing.

3. A method as claimed in claim 1, wherein said location is at a height above the wing which is below 8% of the length of a chord of the wing.

4. A method as claimed in claim 1, wherein said location is at a height above the wing which is between 1% and 4% of the length of a chord of the wing.

5. A method as claimed in claim 1, wherein said signal indicative of imminent stalling is produced when the air turbulence exceeds an air speed dependent threshold, and said using said input signal includes continuously sensing a relationship of the measured air turbulence to said turbulence threshold.

6. A method as claimed in claim 1, wherein said sensing is performed using heated body probe means.

7. A method as claimed in claim 6, wherein said sensing is performed using a hot wire probe.

8. A method of predicting the approaching stall of an aircraft wing, comprising:

directly exposing airspeed sensing means to a free airstream over the wing at a predetermined location spaced above the top surface of the wing and above a boundary layer, to thereby produce input signals representative of airspeed fluctuations at said location, said fluctuations being caused by air turbulence over the wing;

using said input signals to produce a signal representative of a ratio of the airspeed fluctuations to an average airspeed; and using said ratio signal to produce a signal indicative of imminent stalling.

9. A method as claimed in claim 8, wherein said airspeed sensing means is heated body probe means.

10. A method as claimed in claim 8, wherein said location is spaced from the leading edge of the wing by about 66% of the length of a chord of the wing.

11. A method as claimed in claim 8, wherein said location is at a height above the wing which is below 8% of the length of a chord of the wing.

12. A method as claimed in claim 8, wherein said location is at a height above the wing which is between 1% and 4% of the length of a chord of the wing.

13. A method as claimed in claim 9, wherein said airspeed sensing means is a hot wire probe.

14. A method as claimed in claim 8, said signal indicative of imminent stalling is produced when the air turbulence exceeds an air speed dependent threshold, wherein said using said input signals includes continuously sensing a relationship of the measured air turbulence to said turbulence threshold.

* * * * *